No. 48,945.

J. W. HOLLOWAY.
PISTON PACKING.

PATENTED JULY 25, 1865.

Witnesses:
W. H. Burridge
A. W. McClelland

Inventor:
J. W. Holloway

UNITED STATES PATENT OFFICE.

J. W. HOLLOWAY, OF AKRON, OHIO.

IMPROVEMENT IN PISTON-PACKING.

Specification forming part of Letters Patent No. 48,945, dated July 25, 1865.

*To all whom it may concern:*

Be it known that I, J. W. HOLLOWAY, of Akron, in the county of Summit and State of Ohio, have invented certain new and useful Improvements in Steam-Pistons; and I do hereby declare that the following is a full and complete description of the construction and operation of the same, reference being had to the accompanying drawings, making a part of this specification, in which—

Figure 1:
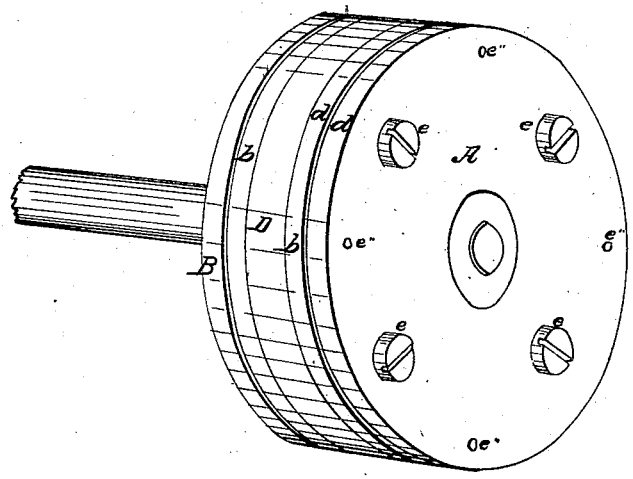
Figure 2:
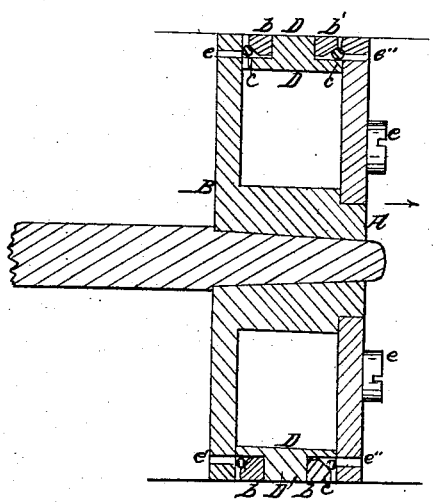
Figure 3:
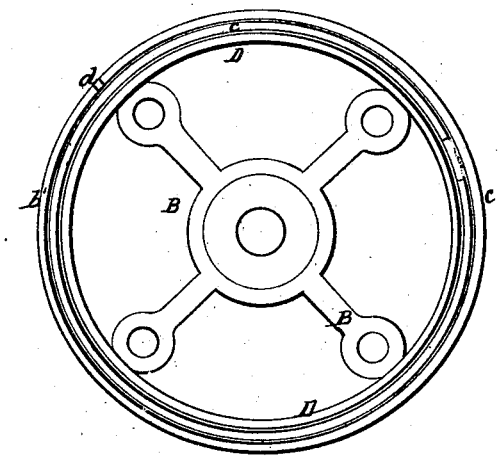

Figure 1 is a perspective view of the piston. Fig. 2 is a sectional view. Fig. 3 is an end view with the follower removed.

Like letters of reference refer to like parts in the several views.

My improvement relates to a piston constructed with beveled rings, together with a solid ring, all being arranged between the flange and follower, whereby the rings forming the packing are kept in close contact, by the action of steam, with the bore of the cylinder, forming a steam-tight packing, as hereinafter described.

In the several figures, B represents the flange, and A the follower or head, of a piston secured together by screws $e$, between which is arranged a solid ring, D, and adjustable rings $b\ b'$. The ring D is formed as represented in Fig. 2. The inner part extends between the flange and follower, and it is recessed out, forming spaces for the reception of the rings $b\ b'$ and circular springs $c\ c$. The projecting part D' of the solid ring is turned to the size of the bore of the cylinder, and the sides form shoulders that the rings $b\ b'$ press against. The rings $b\ b'$ are beveled out on one side, against which beveled sides are placed the circular springs $c\ c$, that when sprung into place keep the rings firmly against the solid ring and out against the cylinder. The beveled rings are cut once in two or separated, as seen at $d$ in Fig. 1, to allow them to expand or contract more or less.

Between each of the separated ends of the rings is a small pin, $d'$, secured respectively in the flange and follower to prevent the rings from moving out of place.

$e'\ e''$ are holes drilled through the flange and follower, by means of which steam is admitted from the cylinder round on two sides of the rings $b\ b'$ in the space shown in Fig. 2. The steam on the under side of the rings presses them out against the cylinder, and the steam on the other side or between the rings, follower, and flange keeps them pressed in close contact with the shoulders or sides of the part D' of the solid ring. As the ring D D' fits into the bore of the cylinder no steam is allowed to blow through.

The pressure of steam around the adjustable rings or packing, as described, will keep them close against the cylinder as the piston is operated, for as the piston moves in the direction of the arrow in Fig. 2 the steam entering through the holes $e'$, coming against the beveled side of the ring $b$, presses it in a diagonal direction up close to the ring D D' and out against the cylinder, as before described, and as the piston moves in the opposite direction the pressure of steam entering through the holes $e''$ will act upon the ring $b'$ in the same manner, the rings forming the spring-packing, thus making a steam-tight joint in the cylinder as it is moved either way. Another advantage of this arrangement is that when the steam is shut off at either end of the cylinder the rings contract, and no friction is produced as the piston is worked up and down.

What I claim as my improvement, and desire to secure by Letters Patent, is—

The beveled rings $b\ b'$ and circular springs $c\ c$, in combination with the solid ring D D', when arranged and operating substantially as and in the manner described.

J. W. HOLLOWAY.

Witnesses:
W. H. BURRIDGE,
A. W. McCLELLAND.